United States Patent [19]
Ko et al.

[11] Patent Number: 5,852,529
[45] Date of Patent: Dec. 22, 1998

[54] DIGITAL SIGNAL RECORDER

[75] Inventors: Jung-wan Ko, Suwon; Soon-tae Kim, Kumi, both of Rep. of Korea

[73] Assignee: Samsung Electronics, Co., Ltd., Suwon, Rep. of Korea

[21] Appl. No.: 654,960

[22] Filed: May 28, 1996

[30] Foreign Application Priority Data

May 29, 1995 [KR] Rep. of Korea ...................... 95-13687

[51] Int. Cl.$^6$ .................................................. G11B 5/584
[52] U.S. Cl. .......................... 360/77.14; 360/40; 341/106
[58] Field of Search ................................ 331/49; 360/40, 360/77.14, 77.13; 341/106, 103, 102, 58

[56] References Cited

U.S. PATENT DOCUMENTS

| | | | |
|---|---|---|---|
| 4,620,311 | 10/1986 | Schouhamer Immink | 341/58 X |
| 5,140,474 | 8/1992 | Kahlman | 360/40 |
| 5,365,232 | 11/1994 | Ido et al. | 360/40 X |
| 5,400,023 | 3/1995 | Ino et al. | 341/58 X |
| 5,432,651 | 7/1995 | Maeno et al. | 360/40 X |

*Primary Examiner*—Aristotelis M. Psitos
*Assistant Examiner*—Alan Faber
*Attorney, Agent, or Firm*—Marger, Johnson, McCollom, & Stolowitz P.C.

[57] ABSTRACT

A digital signal recorder affixes m bits as a prefix to an input information word of n bits to be encoded into a channel word of n+m bits in parallel. The channel word is divided by a common divisor of the period of the channel word of n+m bits and the period of a pilot signal track pattern useful for read head tracking during playback of the recorded data, to form a series of channel word segments. Spectrum data for all possible values or bit patterns of the divided channel word segments, relative to the track patterns, are stored in look-up tables. The channel word having the frequency characteristic of the desired track pattern is selected by accessing the look-up table using the divided channel word (channel word segment) to provide address bits, so that the selected channel word can be processed, selected and recorded in real time.

19 Claims, 8 Drawing Sheets

(HERE: $f_1 = 90T$, $f_2 = 60T$)

FIG. 10

| | 00000 | 00001 | 00010 | 00011 | 00100 | 00101 | 00110 | 00111 | 01000 | 01001 | 01010 | 01011 | 01100 | 01101 | 01110 | 01111 | 10000 | 10001 | 10010 | 10011 | ... | 11110 | 11111 |
|---|---|---|---|---|---|---|---|---|---|---|---|---|---|---|---|---|---|---|---|---|---|---|---|
| 00000 | 1A | 1B | 1C | 1D | 1E | 1F | 1G | 1H | 1I | 1J | 1K | 1L | 1M | 1N | 1O | 1P | 1Q | 1R | 0000 | ... | | | 0000 |
| 00001 | 2A | 2B | 2C | 2D | 2E | 2F | 2G | 2H | 2I | 2J | 2K | 2L | 2M | 2N | 2O | 2P | 2Q | 2R | 0000 | ... | | | 0000 |
| 00010 | 3A | 3B | 3C | 3D | 3E | 3F | 3G | 3H | 3I | 3J | 3K | 3L | 3M | 3N | 3O | 3P | 3Q | 3R | 0000 | ... | | | 0000 |
| 00011 | 4A | 4B | 4C | 4D | 4E | 4F | 4G | 4H | 4I | 4J | 4K | 4L | 4M | 4N | 4O | 4P | 4Q | 4R | 0000 | ... | | | 0000 |
| 00100 | 5A | 5B | 5C | 5D | 5E | 5F | 5G | 5H | 5I | 5J | 5K | 5L | 5M | 5N | 5O | 5P | 5Q | 5R | 0000 | ... | | | 0000 |
| 00101 | 6A | 6B | 6C | 6D | 6E | 6F | 6G | 6H | 6I | 6J | 6K | 6L | 6M | 6N | 6O | 6P | 6Q | 6R | 0000 | ... | | | 0000 |
| 00110 | 7A | 7B | 7C | 7D | 7E | 7F | 7G | 7H | 7I | 7J | 7K | 7L | 7M | 7N | 7O | 7P | 7Q | 7R | 0000 | ... | | | 0000 |
| 00111 | 8A | 8B | 8C | 8D | 8E | 8F | 8G | 8H | 8I | 8J | 8K | 8L | 8M | 8N | 8O | 8P | 8Q | 8R | 0000 | ... | | | 0000 |
| 01000 | 9A | 9B | 9C | 9D | 9E | 9F | 9G | 9H | 9I | 9J | 9K | 9L | 9M | 9N | 9O | 9P | 9Q | 9R | 0000 | ... | | | 0000 |
| 01001 | 10A | 10B | 10C | 10D | 10E | 10F | 10G | 10H | 10I | 10J | 10K | 10L | 10M | 10N | 10O | 10P | 10Q | 10R | 0000 | ... | | | 0000 |
| 01010 | 11A | 11B | 11C | 11D | 11E | 11F | 11G | 11H | 11I | 11J | 11K | 11L | 11M | 11N | 11O | 11P | 11Q | 11R | 0000 | ... | | | 0000 |
| 01011 | 12A | 12B | 12C | 12D | 12E | 12F | 12G | 12H | 12I | 12J | 12K | 12L | 12M | 12N | 12O | 12P | 12Q | 12R | 0000 | ... | | | 0000 |
| 01100 | 13A | 13B | 13C | 13D | 13E | 13F | 13G | 13H | 13I | 13J | 13K | 13L | 13M | 13N | 13O | 13P | 13Q | 13R | 0000 | ... | | | 0000 |
| 01101 | 14A | 14B | 14C | 14D | 14E | 14F | 14G | 14H | 14I | 14J | 14K | 14L | 14M | 14N | 14O | 14P | 14Q | 14R | 0000 | ... | | | 0000 |
| 01110 | 15A | 15B | 15C | 15D | 15E | 15F | 15G | 15H | 15I | 15J | 15K | 15L | 15M | 15N | 15O | 15P | 15Q | 15R | 0000 | ... | | | 0000 |
| 01111 | 16A | 16B | 16C | 16D | 16E | 16F | 16G | 16H | 16I | 16J | 16K | 16L | 16M | 16N | 16O | 16P | 16Q | 16R | 0000 | ... | | | 0000 |
| 10000 | 17A | 17B | 17C | 17D | 17E | 17F | 17G | 17H | 17I | 17J | 17K | 17L | 17M | 17N | 17O | 17P | 17Q | 17R | 0000 | ... | | | 0000 |
| 10001 | 18A | 18B | 18C | 18D | 18E | 18F | 18G | 18H | 18I | 18J | 18K | 18L | 18M | 18N | 18O | 18P | 18Q | 18R | 0000 | ... | | | 0000 |
| 10010 | 19A | 19B | 19C | 19D | 19E | 19F | 19G | 19H | 19I | 19J | 19K | 19L | 19M | 19N | 19O | 19P | 19Q | 19R | 0000 | ... | | | 0000 |
| 10011 | 20A | 20B | 20C | 20D | 20E | 20F | 20G | 20H | 20I | 20J | 20K | 20L | 20M | 20N | 20O | 20P | 20Q | 20R | 0000 | ... | | | 0000 |
| 10100 | 21A | 21B | 21C | 21D | 21E | 21F | 21G | 21H | 21I | 21J | 21K | 21L | 21M | 21N | 21O | 21P | 21Q | 21R | 0000 | ... | | | 0000 |
| 10101 | 22A | 22B | 22C | 22D | 22E | 22F | 22G | 22H | 22I | 22J | 22K | 22L | 22M | 22N | 22O | 22P | 22Q | 22R | 0000 | ... | | | 0000 |
| 10110 | 23A | 23B | 23C | 23D | 23E | 23F | 23G | 23H | 23I | 23J | 23K | 23L | 23M | 23N | 23O | 23P | 23Q | 23R | 0000 | ... | | | 0000 |
| 10111 | 24A | 24B | 24C | 24D | 24E | 24F | 24G | 24H | 24I | 24J | 24K | 24L | 24M | 24N | 24O | 24P | 24Q | 24R | 0000 | ... | | | 0000 |
| 11000 | 25A | 25B | 25C | 25D | 25E | 25F | 25G | 25H | 25I | 25J | 25K | 25L | 25M | 25N | 25O | 25P | 25Q | 25R | 0000 | ... | | | 0000 |
| 11001 | 26A | 26B | 26C | 26D | 26E | 26F | 26G | 26H | 26I | 26J | 26K | 26L | 26M | 26N | 26O | 26P | 26Q | 26R | 0000 | ... | | | 0000 |
| 11010 | 27A | 27B | 27C | 27D | 27E | 27F | 27G | 27H | 27I | 27J | 27K | 27L | 27M | 27N | 27O | 27P | 27Q | 27R | 0000 | ... | | | 0000 |
| 11011 | 28A | 28B | 28C | 28D | 28E | 28F | 28G | 28H | 28I | 28J | 28K | 28L | 28M | 28N | 28O | 28P | 28Q | 28R | 0000 | ... | | | 0000 |
| 11100 | 29A | 29B | 29C | 29D | 29E | 29F | 29G | 29H | 29I | 29J | 29K | 29L | 29M | 29N | 29O | 29P | 29Q | 29R | 0000 | ... | | | 0000 |
| 11101 | 30A | 30B | 30C | 30D | 30E | 30F | 30G | 30H | 30I | 30J | 30K | 30L | 30M | 30N | 30O | 30P | 30Q | 30R | 0000 | ... | | | 0000 |
| 11110 | 31A | 31B | 31C | 31D | 31E | 31F | 31G | 31H | 31I | 31J | 31K | 31L | 31M | 31N | 31O | 31P | 31Q | 31R | 0000 | ... | | | 0000 |
| 11111 | 32A | 32B | 32C | 32D | 32E | 32F | 32G | 32H | 32I | 32J | 32K | 32L | 32M | 32N | 32O | 32P | 32Q | 32R | 0000 | ... | | | 0000 |

DIGITAL SIGNAL RECORDER

This application claims priority from an earlier filed Korean application number 13687 filed May 29, 1995.

FIELD OF THE INVENTION

The present invention relates to digital signal recording, for example recording of digital audio and/or video data on magnetic media such as disk or tape. More specifically, the present invention includes a digital signal recorder for real-time processing and recording of a stream of input data. The input data is processed so as to form recording signals that exhibit selected frequency characteristics useful in guiding read head tracking.

BACKGROUND OF THE INVENTION

When reproducing recorded information from a magnetic recording medium using, for example, a videocassette recorder, if the read head deviates from a target track on the recording medium, the resulting video image will be distorted. Thus, precise "tracking" of the head is critical. Precise tracking is especially necessary in a home digital VCR, since the tracks are quite narrow in order to extend recording time. To achieve precise tracking, the exact degree of deviation from the target track must be calculated. One method to accomplish this uses a "pilot signal" recorded in each track. The magnitude of the crosstalk between the pilot signals of two adjacent tracks (the tracks located on each side of the target track) is used to monitor deviation from the center of the target track.

Figure 1:
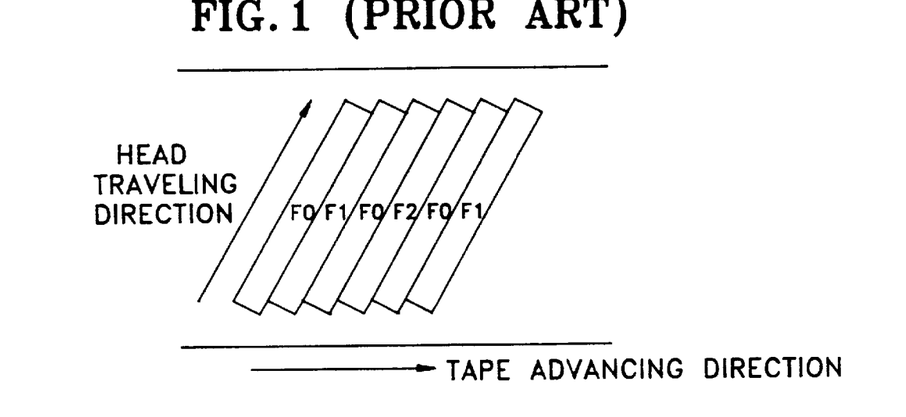
FIG. 1 is a track pattern drawing of a record signal recorded on a magnetic medium.

FIG. 1 illustrates a prior art method of recording a pilot signal on a magnetic medium, e.g., tape. For illustration, the pilot signal is shown here to have three patterns of F0, F1 and F2 repeatedly recorded on the tracks of the tape, and the sequence in FIG. 1 is F0, F1, F0, F2, F0, F1 . . . However, the number of patterns and the order of their recording can vary from one recording system to another.

Figure 2A:
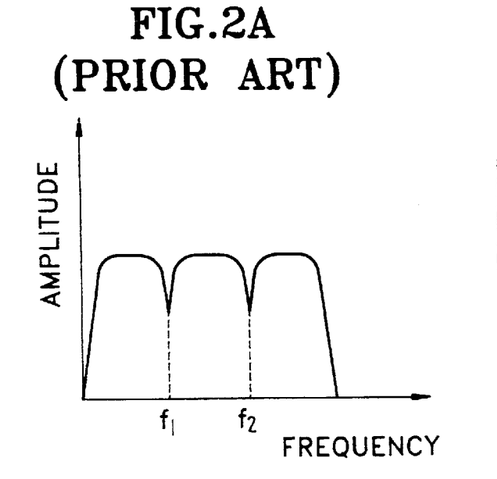
FIGS. 2A to 2C are drawings of frequency characteristics corresponding to the track patterns shown in FIG. 1.
Figure 2B:
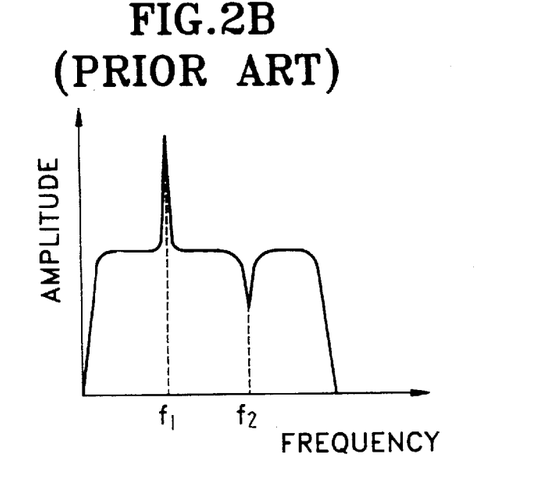
Figure 2C:
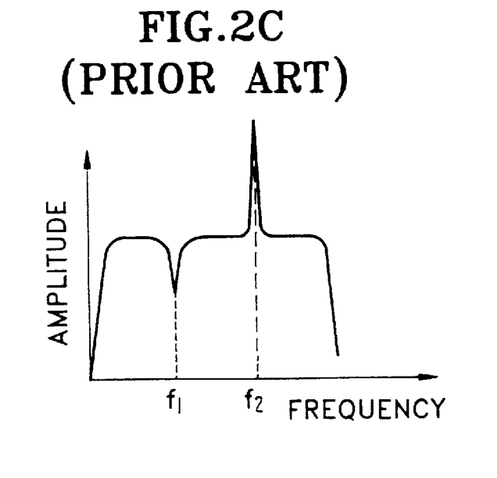

FIGS. 2A, 2B and 2C show the frequency characteristics of the F0, F1 and F2 patterns, respectively. The F0 pattern exhibits notches at frequencies $f_1$ and $f_2$. The F1 pattern exhibits a peak at frequency $f_1$ (pilot signal) and a notch at frequency $f_2$, and the F2 pattern exhibits a notch at frequency $f_1$ and a peak (pilot signal) at frequency $f_2$.

Referring to FIGS. 1 and 2, when reproducing the F0 pattern, the magnitude of crosstalk between the F1 - and F2-pattern pilot signals (the $f_1$ and $f_2$ peaks) of the neighboring track are used. If the head deviates from the center of the F0 track toward the F1 pattern side, the magnitude of the pilot signal of the F1 pattern is greater than that of the F2 pattern, resulting in the $f_1$ frequency component of the reproduced signal increasing, while the $f_2$ frequency component decreases. Conversely, if the head deviates toward the F2 pattern, the $f_2$ frequency component of the reproduced signal increases, while the $f_1$ frequency component decreases.

The magnitudes of the $f_1$ and $f_2$ frequency components of the reproduced signal are compared to each other with respect to the F0 pattern so that the deviation in head tracking can be detected. This information is used to realize precise tracking, for example by adjusting the height of the head mounted on a piezoelectric element by a voltage supplied thereto, or by adjusting a transfer velocity of the magnetic recording medium.

Figure 3:
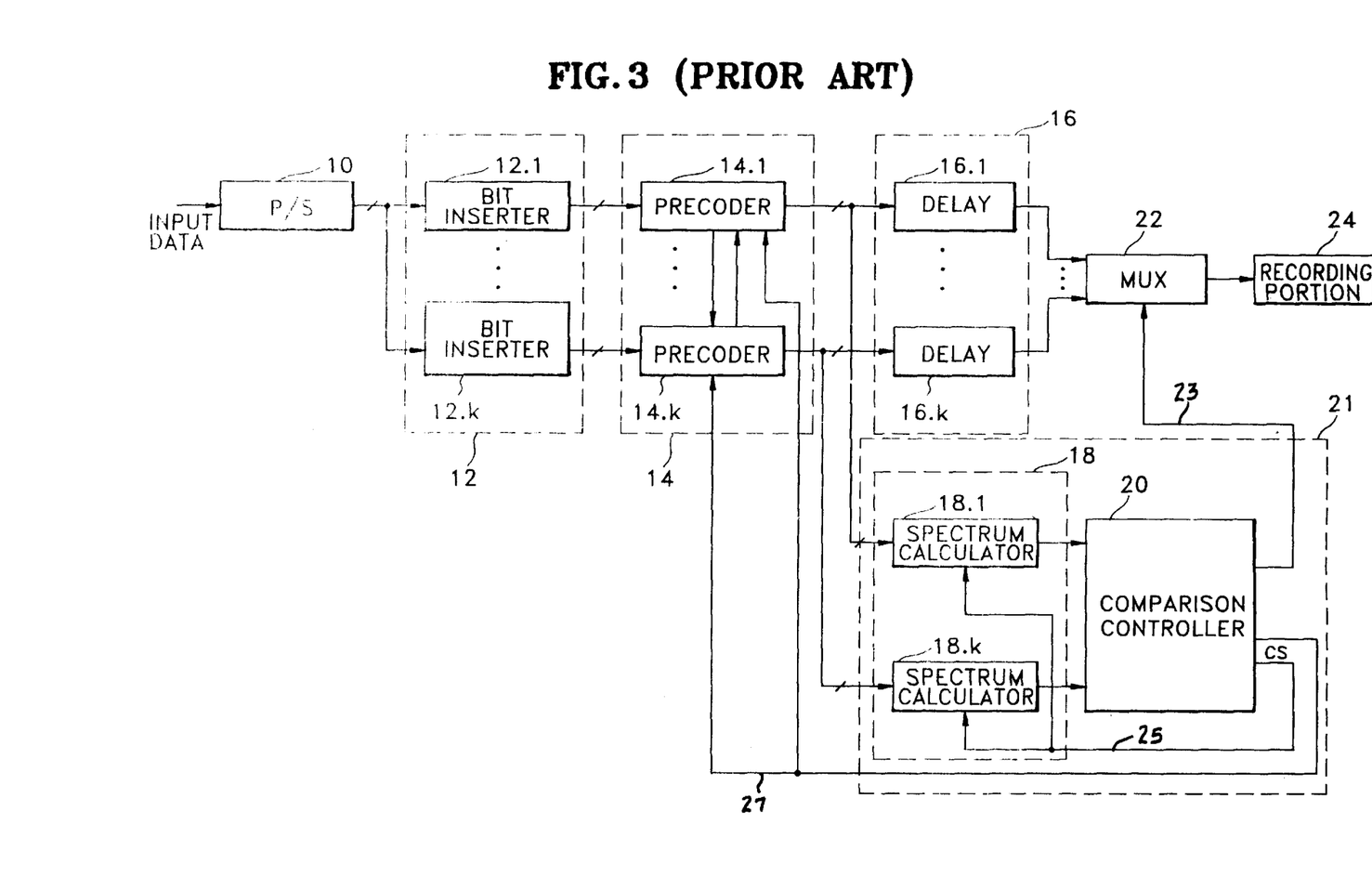
FIG. 3 is a functional block diagram of a conventional digital signal recorder.

A method for recording the conventional F0, F1 and F2 patterns will now be described with reference to FIG. 3 in which a block diagram of a conventional digital signal recorder is shown. Referring to FIG. 3, a parallel-to-serial converter (P/S) 10 converts a parallel 8-bit digital signal into a serial n-bit information word. Here, for example, three parallel 8-bit digital signals are converted into one serial 24-bit information word. The information word is input to a signal inserting section 12, composed of a plurality (here, k) of bit inserters numbered 12.1 to 12.k. Each of the bit inserters receives the same n-bit information word, and inserts a unique combination of m prefix bits immediately in front of the n-bit information word so that the resulting (n+m)-bit word includes a predetermined spectral component.

Each bit inserter provides a respective one of the possible combinations of prefix bits. The total number of possible combinations of prefix bits is of course 2 (exponentiation) m, where m is the number of prefix bits. Thus, if one prefix bit is added to each n-bit information word in signal inserting section 12, two bit inserters are required. One bit inserter provides a first (n+1)-bit information word to which a "0" prefix bit is added, while the other bit inserter provides a second (n+1)-bit information word to which a "1" prefix bit is added. For two prefix bits, four bit inserters are required, and four different (n+2)-bit information words are generated from each n-bit serial information word output from P/S 10. Each of the (n+2)-bit information words has a unique one of the four possible prefixes "00", "01", "10" and "11". These prefix bits slightly alter the frequency content of the word to provide tracking information. The number of prefix bits is not critical. In general, a few prefix bits will be adequate. More prefix bits might improve tracking but at a cost of reducing recording capacity since the prefix bits do not contain content information. All of the resulting (n+m)-bit words are provided in parallel to a modulating section 14, described next. Thus, there are k=2m such information words.

A modulating section 14 comprises a plurality of precoders, namely k precoders, numbered 14.1 to 14.k, where k also equals the number of information words output from the signal inserting section 12 as noted. Each precoder circuit is arranged to receive a respective one of the (n+m)-bit information words, and provides an interleave non-return-to-zero inversion (I-NRZI) encoding on the corresponding information word, to output an (n+m)-bit "channel word".

A frequency analyzing section 18 is composed of k spectrum calculators, numbered 18.1 to 18.k. Each spectrum calculator is arranged to receive a respective one of the channel words from the modulating section 14, and provides a magnitude of the spectral energy of the corresponding channel word relative to a desired tracking pattern F0,F1 or F2. The outputs of all of the spectrum calculators are input to a comparison controller circuit 20.

The comparison controller 20 compares the magnitudes of the spectral energies among the channel words and provides three output signals: First, a selection control signal 23 identifies a "selected channel", namely the channel word having the smallest error signal among the error signals input from the frequency analyzing section 18, each error signal representing the magnitude of the corresponding spectrum component. The selection control signal 23 is output to a selecting section (MUX) 22. Second, feedback control signals 25 (CS) are coupled to the spectrum calculators for updating accumulated operation values (each stored as an (n+m)-bit unit in the corresponding integrator) of each spectrum calculator. Specifically, the accumulated operation values of the integrators in the non-selected channel spectrum calculators are set to the accumulated operation values of the selected channel so that all spectrum calculators reflect the signals actually recorded on the tape. Operation of the spectrum calculator is explained in detail below. Third, comparison controller 20 also provides a set of control signals 27 coupled to the modulator section 14 for replacing the initial values of the precoders with the initial value of the precoder of the selected channel, so that all of the precoders reflect the signals actually recorded on the tape.

The channel words output from the precoders 14 also are input to a delay section 16 comprising a corresponding delaying device (DELAY 16.1 to 16.k) for each channel. The delay section compensates for the time needed to generate the various control signals in the control signal generating section 21. As noted above, control signal generating section 21 includes the frequency analyzing section 18 and the comparison controller circuit 20. Selecting section 22 includes a multiplexer and couples the selected channel word from the corresponding delay device to a recording section 24 for recording on a magnetic medium.

Figure 4:
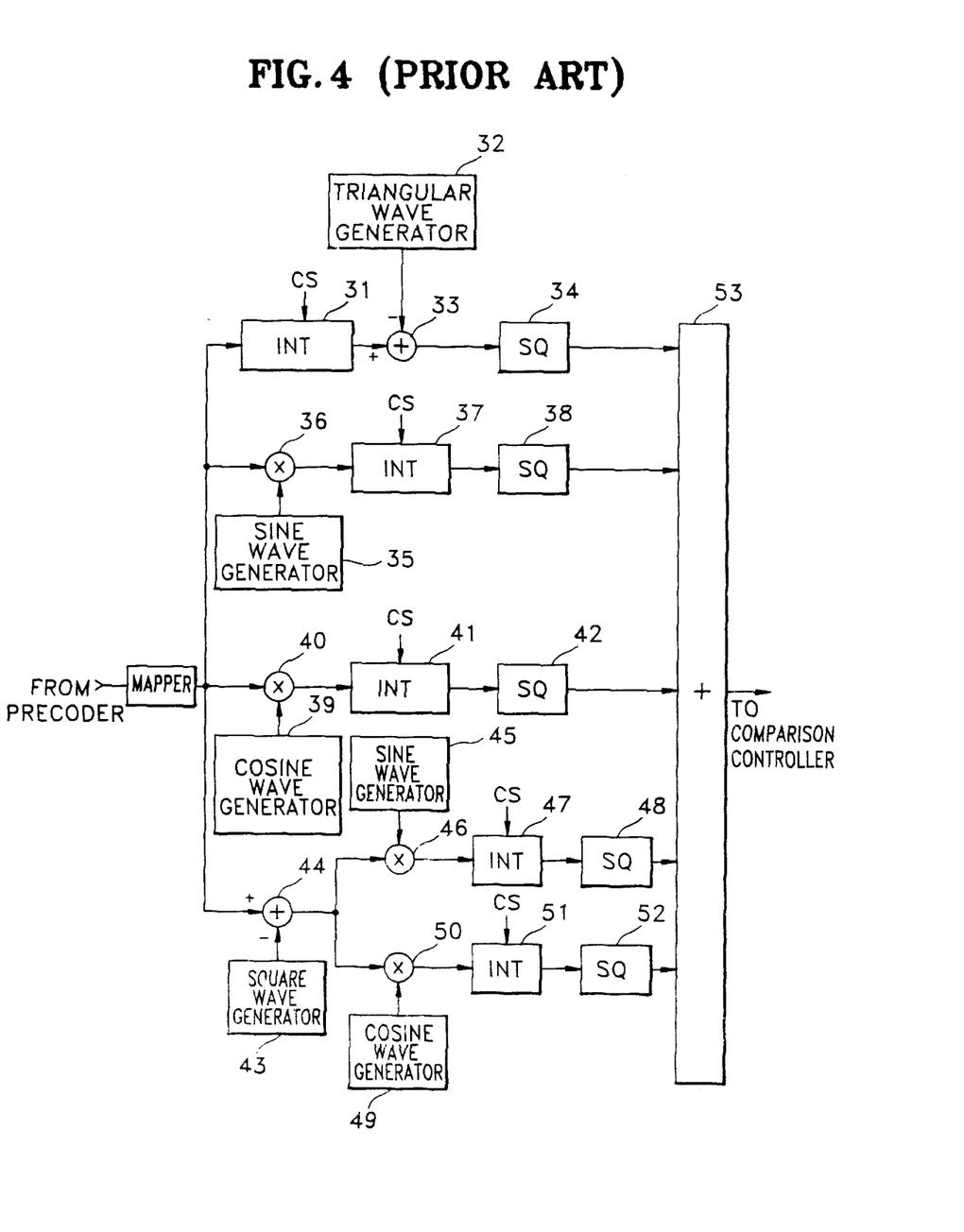
FIG. 4 is a detailed circuit drawing of a spectrum calculator shown in FIG. 3.
Figure 5:
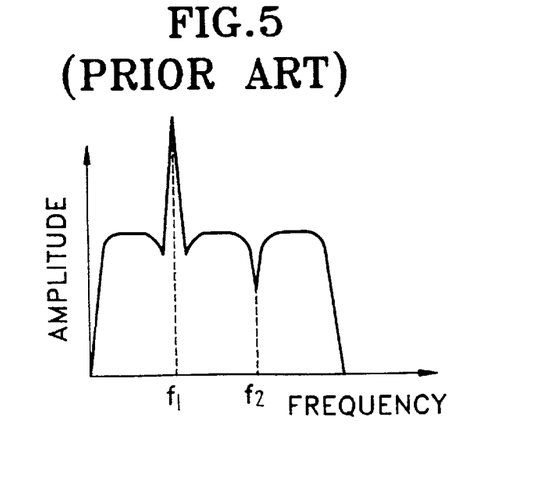
FIG. 5 illustrates a frequency characteristic of the spectrum calculator shown in FIG. 4.

Each of the spectrum calculators has the structure illustrated in detail in FIG. 4. Spectrum calculator 18.1 is illustrative. It has a frequency response as illustrated in FIG. 5. Referring to FIG. 4, spectrum calculator 18.1 first includes a mapper 30 for converting the logic ONEs and ZEROs output from the corresponding precoder 14.1 to I-NRZI modulated arithmetic values that switch between negative and positive arithmetic values of like amplitudes without a direct current component. For example, a logic ONE might map to arithmetic value 5, while ZERO maps to −5. An integrator (INT) 31 receives the mapped series of arithmetic values corresponding to the (n+m)-bit channel word supplied from precoder 14.1 and integrates that series of values with a prestored initial value. The integrator (e.g. accumulator) initial value is set by the control signal (CS) as mentioned above. A triangle waveform generator 32 generates a triangular wave signal corresponding to digital sampled values of a desired frequency (here, $f_1$). A subtractor circuit 33 subtracts the output of the triangle waveform generator 32 from the output of integrator 31, and a squaring element (SQ) 34 squares the difference value obtained from the subtractor so as to form the desired peak at frequency $f_1$, without a DC-component, on the output spectrum of the channel word.

Spectrum calculator 18.1 further includes: a first multiplier 36 for multiplying the mapped output of precoder 14.1 by a digitally synthesized sine-wave $\sin\omega_2 t$ of frequency $f_2$ generated by a sine-wave generator 35; a second multiplier 40 for multiplying the mapped output of precoder 14.1 by a digitally synthesized cosine-wave $\cos\omega_2 t$ of frequency $f_2$ generated by a cosine-wave generator 39; integrators 37 and 41 for integrating the outputs of multipliers 36 and 40, respectively; and squaring elements 38 and 42 for squaring the integration values of integrators 37 and 41, respectively, to form the desired notch at frequency $f_2$ on the output spectrum when the squared values are summed in adder 53.

Spectrum calculator 18.1 still further includes: a square wave generator 43 for generating a square wave of frequency $f_1$; a subtractor 44 for subtracting the square wave from the mapped output of precoder 14.1; a third multiplier 46 for multiplying the substracted value by a sine-wave of frequency $f_1$ generated in a sine-wave generator 45; a fourth multiplier 50 for multiplying the subtracted value by a cosine-wave $\cos\omega_1 t$ of frequency $f_1$ generated in a cosine-wave generator 49; integrators 47 and 51 for integrating the output values of multipliers 46 and 50, respectively; and squaring elements 48 and 52 for squaring the integration values of integrators 47 and 51, respectively, so as to form the desired notch in the output spectrum on either side of a peak at frequency $f_1$ when the squared values are summed in adder 53.

The triangular wave generator 32 can be replaced by one generating a wave complementary to a wave generated by the generator 32, and subtractor 33 can be replaced by an adder, without changing the function of the circuit. Similarly, the square wave generator 43 can be replaced by one generating a wave complementary to the wave generated by the generator 43, and subtractor 44 can be replaced by an adder, again without changing the function of the circuit.

The adder 53 sums the outputs of squaring elements 34, 38, 42, 48 and 52 to form an error signal, and outputs the error signal to the comparison controller 20 of FIG. 3. Each of the k spectrum calculators operates in like fashion, and outputs a respective error signal to the comparison controller responsive to the corresponding channel word. Comparison controller 20 (FIG. 3) receives the error signals of the spectrum calculators and determines which channel word has the smallest error signal, designated the "selected channel" as noted above. The controller generates a selection control signal 23 for routing the selected channel data to the recording section.

Comparing the frequency response shown in FIG. 5 to the F1 pattern shown in FIG. 2B, the reader will observe that a dip is formed on either side of a peak at frequency $f_1$ to facilitate the detection of the pilot signal. The decrease in noise power at the sidebands of frequency of $f_1$ increases the signal-to-noise ratio for detecting the pilot signal at frequency $f_1$. While operation of spectrum calculator 18.1 for generating the F1 pattern has been described, the spectrum calculator is easily reconfigured to generate the other patterns, F2 and F0. For generating the F2 pattern, the operation of spectrum calculator 18.1 is modified essentially by transposing $f_1$ and $f_2$, thereby also transposing $\omega_1$ and $\omega_2$. See FIG. 2C. To generate the F0 pattern, the spectrum calculator 18.1 is modified by disabling the triangle waveform generator 32 and the square wave generator 43.

In the conventional digital signal recorder shown in FIGS. 3 and 4, however, delay is incurred from the time the last bits of the channel words are input to the spectrum calculators while loading the next set of channel words. The spectrum calculator operations, generating the selection control signals, and presetting the accumulated values of the integrators of the non-selected channels to the accumulation values of the selected channel word all contribute to delay. It would be advantageous to provide these functions in real time without employing expensive hardware.

More specifically, the values accumulated in the integrators in the non-selected channels should be preset to the corresponding values accumulated in the integrators of the selected channel without delay, to enable processing the next channel word. However, there is considerable delay due to the multiplier, the integrator and the squaring circuits in the spectrum calculators before the necessary control signals are available. While the control signals are being generated in the comparison controller, the next subsequent channel words are already being input and accumulated in the integrators since the input data stream is continuous in time.

Accordingly, real-time processing is difficult when high-speed signal transmission is needed, due to the limitations in the signal processing speed of the circuit elements described. Relatively high-speed circuit elements are available but expensive. The need remains, therefore, for methods and apparatus capable of real-time digital signal processing at low cost.

SUMMARY OF THE INVENTION

To overcome the problems described above, it is an object of the present invention to provide a digital signal recorder that reduces the delays described above so as to enable real-time operation. According to the present invention, each channel word is partitioned into a predetermined number of segments, and the segments are processed in parallel to speed the selection of the channel word having a desired frequency characteristic.

To accomplish the objects, there is provided a digital signal recorder according to the present invention for converting an information word of n bits into a channel word of n+m bits for recording on an information track of a magnetic record medium. One or more prefix bits are inserted into the information word so as to form 2**m channel words, where m is the number of added prefix bits. For fast processing, the channel words are divided by a predetermined number of bit units so as to form a divided parallel channel word or "channel word segment". Spectrum data reflecting at least one predetermined track pattern, and corresponding to the every possible value of the channel word segment, is stored in a look-up table. For each segment, the spectrum data is generated using the segment bits as an address. The spectrum data is accumulated in real time for selecting the channel word having a desired frequency characteristic on the basis of the analyzed spectrum. The selected channel word is recorded on the information track of the magnetic recording medium as a serial channel word.

BRIEF DESCRIPTION OF THE DRAWINGS

The foregoing objects and advantages of the present invention will become more apparent by describing in detail a preferred embodiment thereof with reference to the attached drawings in which:

FIG. 10 illustrates a data region of the look-up table shown in FIG. 8A.

DETAILED DESCRIPTION OF A PREFERRED EMBODIMENT

Parallel processing a channel word of n information bits plus a prefix of m bits, requires that the following conditions are met. First, the selected pilot signal frequencies, $f_1$ and $f_2$, are selected such that each pilot frequency has a period that is an integer multiple of the period of the signal processing clock (system clock). And second, there must be a common divisor of the periods of the selected pilot frequencies and the period of the (n+m bit) channel word. The common divisor is abbreviated (CD). The modulated channel word is partitioned by the common divisor (CD) so as to form a plurality of channel word segments. The spectra of these channel word segments are analyzed in order to select the channel word having a desired spectrum characteristic in real time. The common divisor (CD) becomes a factor in determining the maximum operating speed, since the required processing time will be proportional to a ratio of the channel word size (n+m bits) to the common divisor(CD), as further described later.

Figure 6:
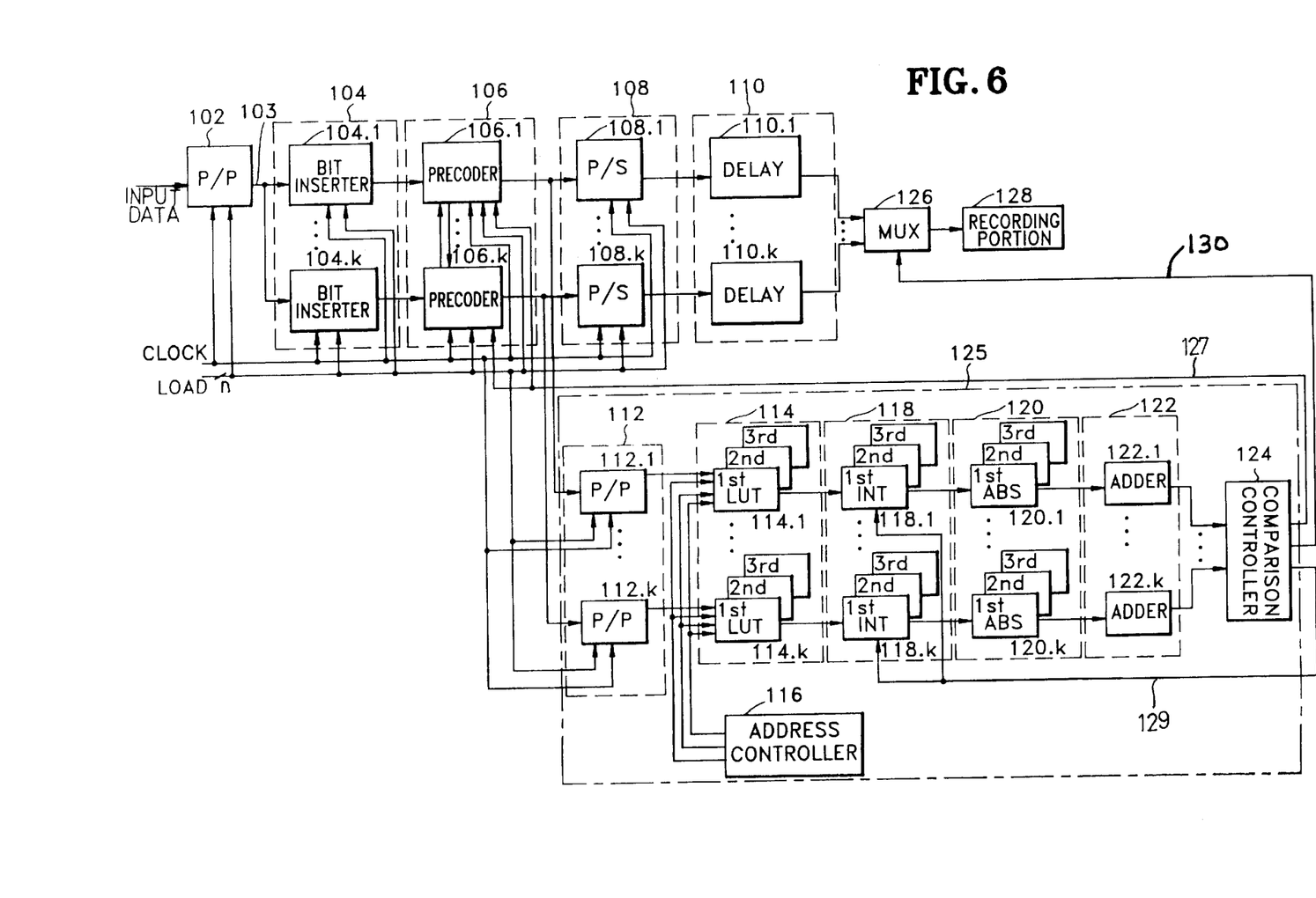
FIG. 6 is a block diagram illustrating one embodiment of a digital signal recorder according to the present invention.

FIG. 6 is a block diagram reflecting one embodiment of a digital signal recorder according to the present invention. The digital signal recorder shown in FIG. 6 includes: a parallel-to-parallel (P/P) converting section 102 for converting digital data input in parallel into an information word of n bits; a signal inserting section 104 including a plurality (here, k) of bit inserters 104.1 to 104.k for inserting m bits in front of the information word; a modulating section 106 including a plurality of precoders 106.1 to 106.k for preceding the information word of n+m bits to form a channel word of n+m bits; a first signal converting section 108 including a plurality of P/S converter 108.1 to 108.k for converting the outputs of the plurality of precoders 106.1 to 106.k into serial signals; a time compensating section 110 including a plurality of delaying devices 110.1 to 110.k, each for delaying the serial signals in the corresponding channel.

A second signal converting section 112 includes a plurality of P/P converters 112.1 to 112.k for dividing the channel word of n+m bits (output from the plurality of precoders 106.1 to 106.k) by the common divisor (CD); a memory 114 includes a predetermined number (here, three) look-up tables (LUT) per each channel for storing the spectrum component to be analyzed, organized by track pattern. The LUT includes prestored data corresponding to the divided channel word segment supplied from each P/P converter of section 112. An address controller 116 provides addresses for accessing LUTs 114.1 to 114.k. An accumulating section 118 includes a predetermined number of integrators 118.1 to 118.k per each channel for accumulating data read out from each LUT of memory 114. An absolute value calculating circuit 120 includes a predetermined number of absolute value calculators 120.1 to 120.k per each channel for calculating the absolute value of each integrator of accumulating circuit 118 (Also, absolute value calculators 120.1 to 120.k can be implemented as a squaring circuit.). An adder circuit 122 includes adders 122.1 to 122.k for summing the outputs of the absolute value calculators of each channel; and a comparison controller 124 to provide the following three control signals:

First, the comparison controller 124 provides a selection control signal 130 for selecting the channel word having the smallest error signal among the error signals supplied from the adder section 122. The selected channel is the channel most closely having a selected frequency characteristic as reflected in data stored in the LUT. The selection control signal 130 is input to a multiplexer 126 for directing the selected channel data to a recording section 128 for recording.

Second, the comparison controller 124 provides a feedback signal 129 to the accumulating circuit 118. Its function is to update the initial values in the integrators (accumulators) in the non-selected channels so as to coincide with the corresponding accumulators in the selected channel of the accumulating section.

Third, the comparison controller 124 provides a feedback signal 127 to the modulating section 106 for updating the initial values of precoders 106.1 to 106.k so as to coincide with the precoders in the selected channel. Elements 112, 114, 118, 120, 122 and 124 thus together form a control signal generating section 125.

In general, the digital signal recorder shown in FIG. 6 records the channel word having a desired frequency characteristic by affixing m bits as a prefix to the information word unit of n bits. Since the information word content (data) is not known in advance, all possible prefix bit combinations are analyzed and the best (least error) channel word is selected and recorded. Operation of the recorder shown in FIG. 6 is further explained by way of an example of 24/25 modulation where m is 24, n is 1, and CM is 5 with reference to FIGS. 7 to 10.

Referring to FIG. 6, P/P converting section 102 receives the digital input data as eight-bit words, and outputs the data as information word of 24 bits. Thus, the P/P converter LOAD signal is asserted thrice for each 24-bit information word. Signal inserting section 104 inserts a "0" bit or a "1" bit in front of each information word. Section 104 provides the two (now 25-bit) words in parallel to the precoder section 106.

Figure 7:
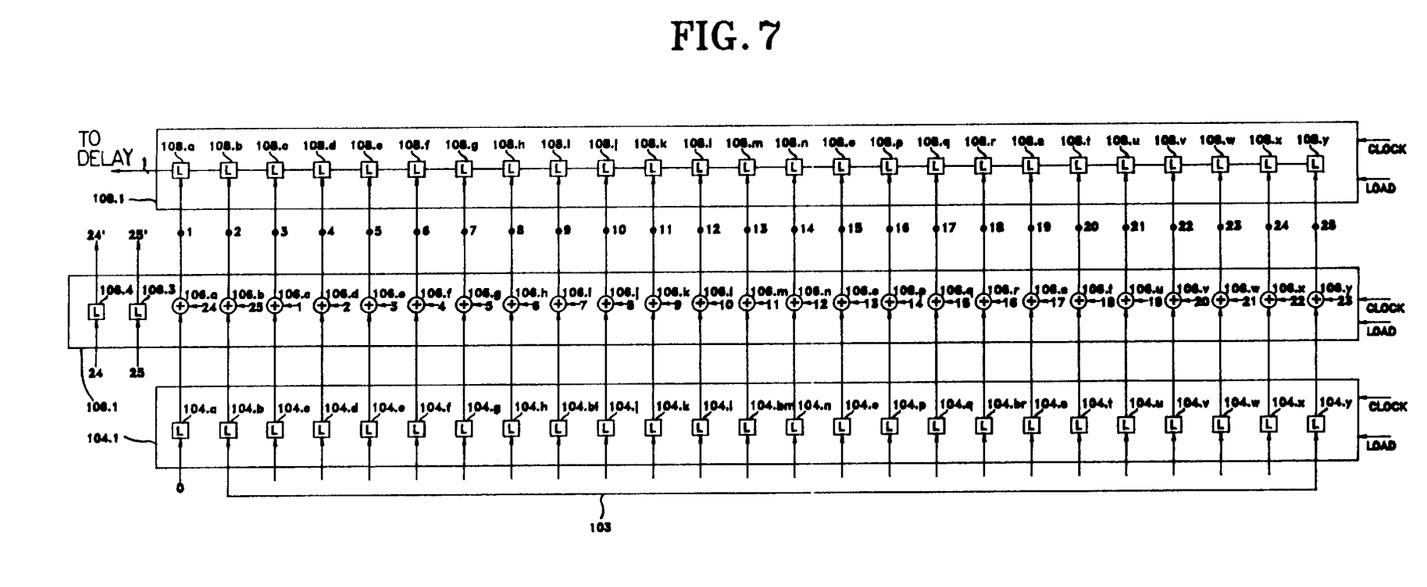
FIG. 7 is a detailed drawing of selected portions of the signal recorder of FIG. 6.

FIG. 7 is a detailed block drawing of an individual bit inserter 104.1, a precoder 106.1, and P/S converter 108.1 in a configuration in which a "0" bit is inserted into the information word. Thus FIG. 7 illustrates just one of k channels (where k=z in the example). Referring to FIG. 7, "0" bit inserter 104.1 includes 25 latches 104.a to 104.y. It inserts bit "0" to latch 104.a for storing the most significant bit in response to the load signal and a system clock, and stores the information word of 24 bits provided via bus 103 of P/P converting section 102 to the remaining 24 latches 104.b to 104.y.

First inputs of exclusive-or gates (XOR) 106.a to 106.y of precoder 106.1 shown in FIG. 7 are respectively coupled to the outputs of latches 104.a to 104.y of "0" bit inserter 104.1. Second inputs of XORs 106.a and 106.b are respectively coupled to the outputs of latches 106.3 and 106.4, and second inputs of XORs 106.c to 106.y are respectively coupled to the outputs of XORs 106.a to 106.w. The outputs of XORs 106.x and 106.y are respectively coupled to the inputs of latches 106.4 and 106.3. The operation of precoder 106.1 having such a structure is explained as follows.

The second least significant bit of the previous channel word of 25 bits (#24 in FIG. 7) and the most significant bit (here, inserted "0" bit) of the present channel word are input to XOR gate 106.a. The least significant bit of the previous channel word (#25) and the second most significant bit of the present channel word (104.b) are input to XOR gate 106.b. The output of XOR gate 106.a and a second bit of the input data (104.c) are input to XOR gate 106.c, and the output of XOR gate 106.b ("2") and a third bit of the input data are input to XOR gate 106.d. The XOR gates 106.e through 106.y precode the remaining data of the 25-bit channel word in a similar manner. The data of each of XOR gates 106.a to 106.y is the channel word (alternatively called the "modulation data") of 25 bits output in parallel from precoder 106.1.

P/S converter 108.1 shown in FIG. 7 receives the output of all of XOR gates 106.a to 106.y responsive to a load signal (in parallel or "broadside" load), and outputs a serial channel word of 25 bits, responsive to the clock signal, to the delay section 110. P/S converter 108.1 includes 25 latches 108.a to 108.y. The delay section 110 (devices 110.1 to 110.k of time compensating section 110) compensates for the time needed to generate the control signals mentioned above in the control signal generating section 125.

Each P/P converter of the second signal converting section 112 divides the 25-bit channel word (output in parallel from modulating section 106) by a unit of five bits, and outputs a series of five, 5-bit segments. Thus P/P converter 112 provides time division multiplexing of the channel word. Each 5-bit segment from each P/P converter becomes a lower address for accessing the look-up tables described next.

Figure 8A:
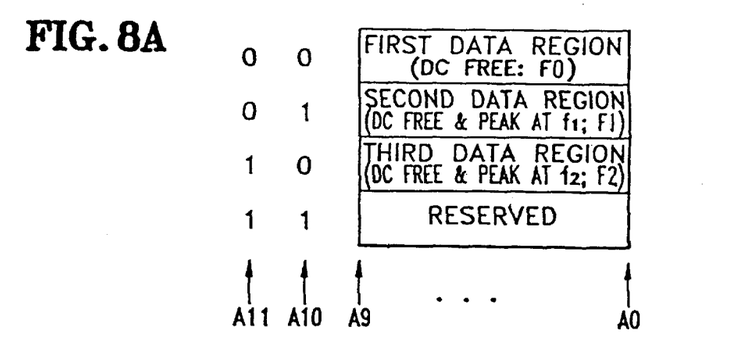
FIGS. 8A to 8C illustrate contents and organization of the look-up tables shown in FIG. 6.
Figure 8B:
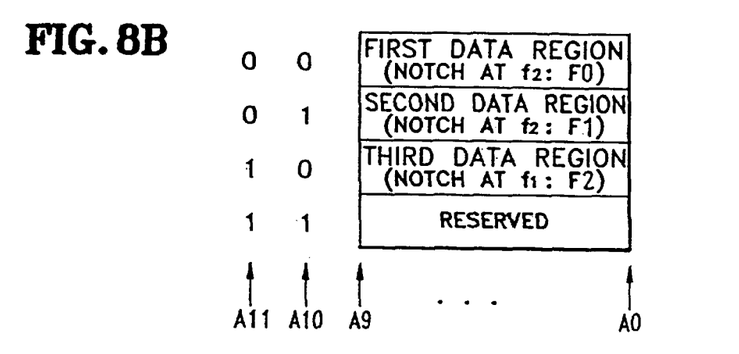
Figure 8C:
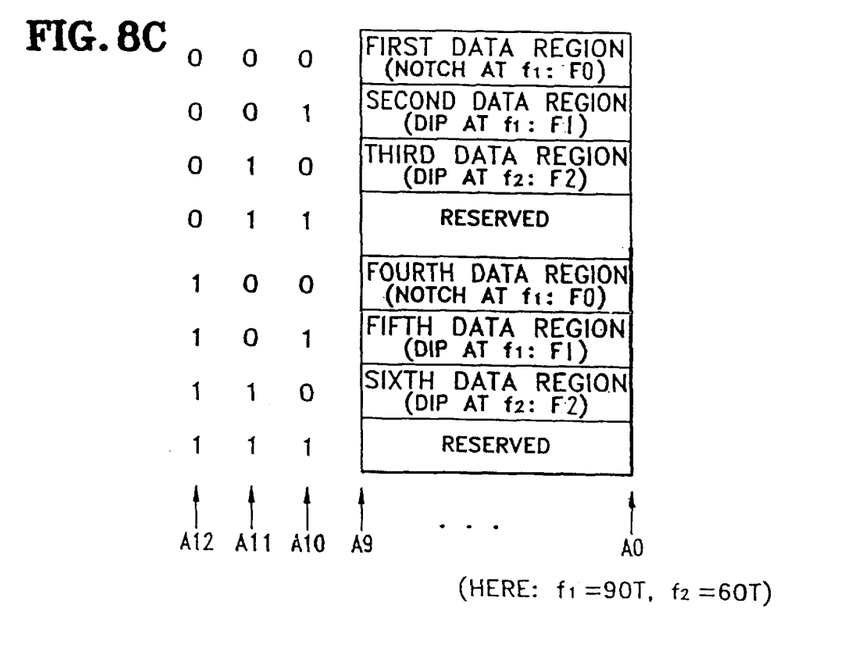

Each channel has three look-up tables ("LUTs") arranged as shown in FIGS. 8A to 8C. Referring to FIG. 8A, the first LUT stores data that exhibit peaks at the predetermined pilot frequencies $f_1$ and $f_2$. In FIG. 8B, the second LUT stores data that exhibit notches at selected frequencies. And the third LUT (FIG. 8C) stores data that exhibit notches and dips to either side of the selected pilot frequencies as further explained shortly. Each LUT has a plurality of regions for storing different sets of data.

First LUT

Referring now to FIG. 8A, the first LUT of each channel includes three effective data regions for storing data having the desired spectral peaks, corresponding to patterns F0,F1 and F2, respectively. Accordingly, data having a notch near zero hertz as in the F0 pattern and having no DC component are stored in a first data region of the first LUT. Data having the desired peak at frequency $f_1$ as in the F1 pattern and having no DC component are stored in a second data region of the first LUT. And data having the desired peak at frequency $f_2$ as in the F2 pattern and having no DC component are stored in a third data region.

Figure 9A:
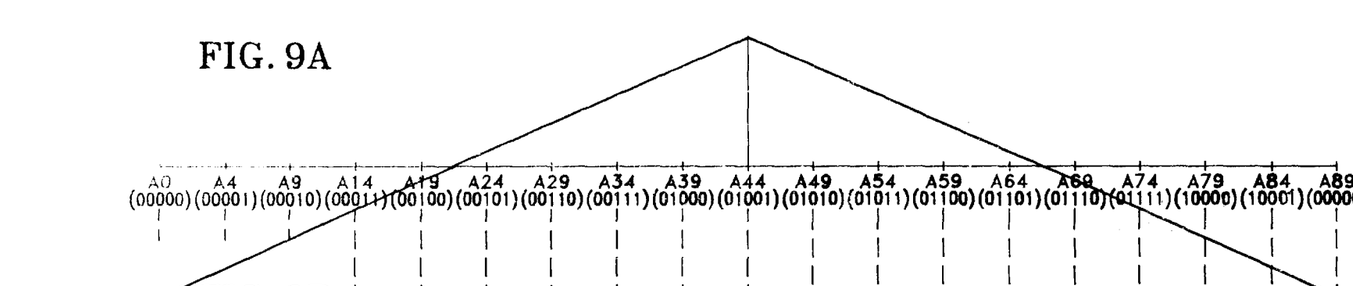
FIGS. 9A to 9C illustrate a triangular wave signal, a square wave signal, and a sine wave signal, respectively.

The look-up tables are used for spectral energy calculations on the channel words as follows. In order to have the desired peak at frequency $f_1$ while having no DC component, as shown in FIG. 9A, the triangular wave signal of frequency $f_1$ (here, $f_1 = 90T$ and $T = 1/f_b$, where $f_b$ is bit frequency) and "0" bias signal is subtracted from or added to the accumulated channel word of 25 bits. Referring back to FIG. 4, it will be recalled that in the prior art the desired peak was formed at the frequency $f_1$ by subtracting the triangular wave from the accumulated channel word of 25 bits after the 25-bit channel word was accumulated in an integrator 31. Referring now to FIG. 6 of the present invention, note the integrator 118.1 follows LUT 114.1. Here, a square wave signal (refer to FIG. 9B) is obtained by differentiating the triangular wave signal (refer to FIG. 9A). This square-wave is subtracted from the channel word to obtain the same result. Thus the function of triangular wave generator 32 and adder 33 in prior art FIG. 4 are implemented by memory lookup in the second data region of the first LUT of the present invention.

Accordingly, the bias signal is "0" and the square wave signal is sampled at each clock period T to get 90 samples per cycle of the square wave signal. The sampled result is divided by the common divisor of the frequency $f_1$ (period 90T) and the channel word of 25 bits (period 25T), namely, five units. In effect, the square wave is sampled every five T or clock cycles so as to form a series of eighteen sample values. Thus eighteen addresses ("00000" through "10001") are generated with respect to the square wave.

Dividing the channel word of 25 bits by the common divisor 5 yields 5 "channel word segments" of 5 bits each. Thus, each channel word segment can take one of 32 possible values. For each such value, a resulting series of values is obtained by subtracting the series of square wave sample values. The 32 different results are stored in the second data region of the first LUT as shown in FIG. 10, using the channel word segment (5 bits) as the lower address bits for accessing the LUT. In FIG. 10, only columns 0 to 17 have data, as there are only eighteen sample values of the squarewave. For forming a peak response at frequency $f_2$ as in pattern F2, data is formed in a similar manner and stored in the third region of the first LUT. In that case, F@=60T so only 12 columns of data need to be stored in the LUT.

Second LUT

As shown in FIG. 8B, the second LUT of each channel includes three effective data regions for storing spectrum data that exhibit the desired notch according to each track pattern. Specifically, data having the desired notch at the frequency $f_2$ of the F0 pattern are stored in the first data region of the second LUT. Data having the desired notch at frequency $f_2$ of the F1 pattern are stored in the second data region, and data having the desired notch at frequency $f_1$ of the F2 pattern are stored in the third data region of the second LUT.

Figures 9B, 9C:
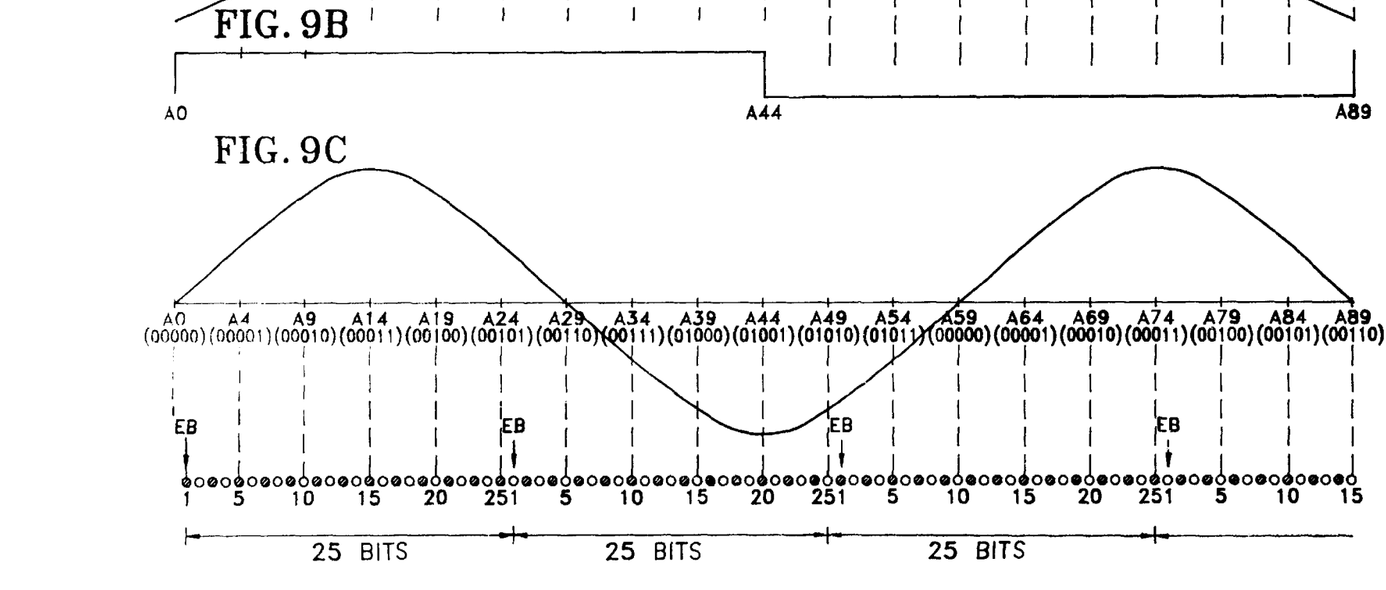

To form the desired notch at frequency $f_2$ in the F1 pattern, a sum of the values obtained by multiplying the channel word by a sine-wave and by a cosine-wave, each having the frequency $f_2$ (here, 60T as shown in FIG. 9C), is stored in the second data region of the second LUT. Thus the functions of the circuitry shown in FIG. 4 comprising sine-wave generator 35, cosine-wave generator 39 and multipliers 36 and 40 are implemented by the second data region of the second LUT.

The LUT data is formed as follows. The sine-wave (refer to FIG. 9C) and the cosine-wave (not shown) each have 60 sampled values per period, i.e. one per clock cycle. Dividing the total 60 samples by the common divisor (CD) of the frequency $f_2$ (60T) and the channel word of 25 bits (25T), which is five, equals 12 samples per period. Each sample value is assigned a corresponding one of twelve addresses ("00000" to "01011").

We multiply respectively each of the 12 sine wave sampled values by the 32 possible bit patterns or values of the 5-bit channel word segment. And we multiply respectively each cosine wave sampled values by the same the 32 possible bit patterns or values of the 5-bit channel word segment. The sum of these two values is stored in the second region of the LUT.

As shown in FIG. 8C, the third LUT of each channel includes six effective data regions, namely, three data regions for storing data forming dips on either side of the peak frequency according to each track pattern when the square wave signal is positive, and three such regions for the case when the square wave signal is negative. In particular, data having the desired notch at frequency $f_1$ of the F0 pattern are stored in the first and fourth regions of the third LUT; data having a dip on either side of the frequency $f_1$ and having the peak in the F1 pattern are stored in the second and fifth data regions; and data having a dip on either side of the frequency $f_2$ and having the peak in the F2 pattern are stored in the third and sixth data regions.

For example, as shown in FIG. 9B, in order to have dip on either side of the frequency $f_1$ of the F1 pattern, a sum of the values obtained by multiplying the subtracted (or added) result after the square wave signal having frequency $f_1$ (here, 90T) is subtracted from (or added to—for the other dip) the channel word, by the sine-wave and cosine-wave system functions, each having the frequency $f_1$, should be stored in the first and fourth data regions of the third LUT. The structure of square wave generator 43, subtractor 44, sine wave generator 45, multipliers 46 and 50 and cosine wave generator 49 shown in FIG. 4 corresponds to the second and fourth data regions of the third LUT.

When the sine-wave and cosine-wave system functions, each having the frequency of 60T, are divided by the common divisor of each $f_1$ frequency, namely, five sample units, while the square wave signal (refer to FIG. 9B) is positive, nine addresses ("00000" to "01000") are generated. When the sine wave and cosine-wave system functions having the frequency of 60T are divided by five sample units when the square wave signal (refer to FIG. 9B) is negative, nine additional addresses ("01001" to "10001") are generated.

The sum of the values obtained by respectively multiplying each sine wave system function and cosine wave system function data of 5 bits corresponding to the generated nine addresses by 32 data capable of being expressed by the corresponding channel word of 5 bits is stored in the second data region of the third LUT when the square wave signal is positive, and the same such sum is stored in the fifth data region of the third LUT when the square wave signal is negative. Thus, a resultant value obtained by calculating the spectrum according to the track pattern of the channel word segment of 5 bits, supplied from each P/P converter, is stored in the three LUTs of each channel.

While the illustrated embodiment includes three LUTs per channel in order to obtain the frequency characteristic shown in FIG. 5, the invention can be implemented to include two LUTs per channel in order to obtain the frequency characteristic shown in FIGS. 2A to 2C.

In address controller 116, one bit (the most significant address bit) indicating a positive value or a negative value of the supplied square wave signal, is supplied only to the third LUT. Two bits (the second most significant address A11, A10) corresponding to F0, F1 and F2 patterns, selected the corresponding data region of each LUT.

Referring to FIGS. 8A–8C, 12-bit address, whose five lower bits (i.e., the channel word segment) are supplied from the corresponding P/P converters and whose seven upper bits are supplied from address controller 116, is supplied to the first and second LUTs (FIGS. 8A and 8B). A 13-bit address, whose five lower bits (i.e., the channel word segment) are supplied from the corresponding P/P converter and whose eight upper bits are supplied from address controller 116, as explained above, is input to the third LUT (FIG. 8C). The resultant value of the spectrum of 5-bit units according to each track pattern prestored in the LUT is read out to be input to the integrator of the accumulation circuit 118 connected to each LUT. Each integrator accumulates the resultant value of 5-bit units to accumulate the resultant value of the spectrum corresponding to the full channel word of 25 bits. The code-to-arithmetic mapper 30 of FIG. 4 is no longer necessary.

The absolute value of the accumulated value of each integrator is calculated in the corresponding absolute value calculator circuit 120. Each adder of adding circuit 122 sums the outputs of the three absolute value calculators per channel to provide the corresponding sum as the error signal.

Comparison controller 124 generates the selection control signal 130 for selecting the channel word having the smallest error signal among the error signals supplied from adding circuit 122. The comparison controller also generates a control signal 129 so that the values of the integrators in all of the non-selected channels are preset to the value of the integrator of the selected channel. Also, comparison controller 124 outputs a control signal 127 to each precoder so that the initial values of the precoders coincide with one another. Specifically, the initial values of the precoders in each non-selected channel is replaced with the initial value of the precoder of the selected channel.

Selecting section 126 selects the channel word of 25 bits having a "0" bit prefix or the channel word of 25 bits having a "1" bit prefix according to the selection control signal. The channel word selected by selection section 126 is recorded on the digital video tape through recording section 128, or is transmitted through a transmission path.

Accordingly, the digital signal recorder of the present invention divides the channel word by a common divisor (CD) and calculates the divided channel word (or segment) in parallel so as to select the channel word having a desired frequency characteristic per clock period of n+m bits. The resultant error values, relative to predetermined frequency characteristics, are compared to form a selection control signal for selecting the channel word having the desired frequency characteristics. And the value accumulated in the integrator of the selected channel is provided by a control signal to update the values of the integrators in the non-selected channels, thereby enabling real-time processing of the input data stream.

As described as above, the digital signal recorder of the present invention processes the channel word of n+m bits in which m bits are affixed to the information word of n bits in parallel, so as to generate the selection control signal for selecting the channel having the desired frequency characteristic before the next channel word of n+m bits is input. Thus, the (n+m)-bit channel word can be processed in real-time for recording.

Also, the digital signal recorder of the present invention divides the channel word of n+m bits in parallel for addressing a LUT that contains pre-recorded data reflecting the resultant value of the spectrum, arranged by track pattern with the divided channel word unit to thereby generate the selection control signal for selecting the channel word having the desired spectrum, thus enabling a reduction in hardware.

what is claimed is:

1. A digital signal recorder for recording digital information on an information track of a magnetic recording medium, said digital signal recorder comprising:

an input port (102) for receiving an information word of n bits in parallel;

means for inserting m additional bits (104) into the n-bit information word so as to form a plurality of n+m bit channel words, the m additional bits in each channel word being set to a unique one of the 2**m possible values of m bits;

control signal generating means (125) for receiving and analyzing the plurality of channel words in parallel, the control signal generating means including a number of channels at least equal to the number of channel words, each channel arranged for processing a respective one of the channel words and each channel including:

time division multiplexing means (112) for dividing the corresponding channel word by a predetermined number of bit units so as to form a plurality of channel word segments;

memory means (114) for storing predetermined spectrum data according to a predetermined track pattern; and means for analyzing frequency characteristics (118, 120,122) of the corresponding channel word by using the stored spectrum data to form an error signal;

a comparison controller (124) for generating a selection control signal corresponding to the channel word having a smallest error signal frequency characteristic on the basis of the analyzed spectrum;

means for selecting one of the channel words of n+m bits supplied from said encoding means in response to the selection control signal; and recording means for recording the selected channel word on the information track of the magnetic recording medium.

2. A digital signal recorder for recording digital information on an information track of a magnetic recording medium, said digital signal recorder comprising:

an input port for receiving an information word of n bits in parallel;

means for inserting m additional bits into the n-bit information word so as to form a plurality of n+m bit channel words, the m additional bits in each channel word being set to a unique one of the 2**m possible values of m bits;

control signal generating means for receiving and analyzing the plurality of channel words in parallel, the control signal generating means including a number of channels at least equal to the number of channel words, each channel arranged for processing a respective one of the channel words and each channel including;

time division multiplexing means for dividing the corresponding channel word by a predetermined number of bit units so as to form a plurality of channel word segments;

memory means for storing predetermined spectrum data according to a predetermined track pattern; and means for analyzing frequency characteristics of the corresponding channel word by using the stored spectrum data to form an error signal;

a comparison controller for generating a selection control signal corresponding to the channel word having a smallest error signal frequency characteristic on the basis of the analyzed spectrum;

means for selecting one of the channel words of n+m bits supplied from said encoding means in response to the selection control signal; and recording means for recording the selected channel word on the information track of the magnetic recording medium, and wherein;

the memory means includes a predetermined number of memories for each channel, each memory storing predetermined spectrum data corresponding to a selected track pattern,and including spectrum data for the selected track pattern corresponding to all possible values of the channel word segment;

an address controller is coupled to the memories for generating an address signal to access spectrum data stored in said memories according to said track pattern;

the means for analyzing frequency characteristics of the corresponding channel word includes a plurality of accumulation circuits for each channel, each accumulation circuit coupled to a corresponding one of the memories for accumulating said spectrum data read out from the corresponding memory responsive to each channel word segment;

a like plurality of absolute value calculating circuits for each channel, each absolute value calculating circuit coupled to a corresponding one of the accumulation circuits for calculating an absolute value of the accumulated spectrum data;

an adder circuit in each channel, arranged for summing together all of the said calculated absolute values so as to form the channel error signal; and wherein the comparison controller provides the selection control signal for selecting the channel word having the smallest signal by comparing the outputs of said adder circuit of each channel, and generates a control signal for presetting the accumulated values of the accumulation circuits in all of the channels other than the selected channel to the value of the accumulation circuit in the selected channel.

3. A digital signal recorder according to claim 2, wherein said memory in each channel includes a plurality of look-up tables, each look-up table including at least one data region comprising data that exhibit a peak in frequency characteristic and having no DC component according to said track pattern.

4. A digital signal recorder according to claim 2, wherein said memory in each channel includes a plurality of look-up tables, each look-up table including at least one data region comprising data that exhibit a notch in frequency characteristic according to said track pattern.

5. A digital signal recorder according to claim 2, wherein said memory in each channel includes a plurality of look-up tables, each look-up table including at least one data region comprising data that exhibit a dip in frequency characteristic on either side of a peak in frequency characteristic according to said track pattern.

6. A digital signal recorder according to claim 2, wherein said memory means in each channel comprises:
   a first LUT including data regions in which data that exhibit a peak in frequency characteristic and having no DC component according to said track pattern is stored;
   a second LUT including data regions in which data that exhibit a notch in frequency characteristic according to said track pattern per each channel is stored; and
   a third LUT including data regions in which data that exhibit a dip in frequency characteristic on either side of said peak according to said track pattern is stored.

7. A digital signal recorder according to claim 2, wherein said predetermined number of said time division multiplexing means is a common multiple of the period of said channel word of n+m bits and the period of spectral energy to be controlled according to said track pattern, and wherein the period of said spectral energy is an integer multiple of a system clock period.

8. A digital signal recorder according to claim 7, wherein m is one, n is 24 and the common multiple is five.

9. A digital signal recorder according to claim 7, wherein said memory of each channel receives a parallel divided channel word segment from said time division multiplexing means as a lower address and receives the address supplied from said address controller as an upper address, so as to read out spectrum data corresponding to said spectral energy according to said upper and lower addresses.

10. A digital signal recorder for converting an information word of n bits into a channel word of n+m bits to record the converted channel word as digital information on an information track of a magnetic record medium, said digital signal recorder comprising:
   an input port for receiving said information word of n bits in parallel;
   encoding means for inserting m bits into said information word of n bits input in parallel to be converted into at least two channel words of n+m bits, and outputting the converted channel words;
   time division multiplexing means for dividing said converted channel words by a bit unit corresponding to a common multiple of the period of the channel word of n+m bits and the period of spectral energy controlled according to a predetermined track pattern, to thereby output the divided each channel word as a divided parallel channel word;
   memory means for each channel, for storing spectrum data of said spectral energy controlled according to said track pattern corresponding to all data capable of being expressed by said divided parallel channel word;
   address control means for controlling an address so that said spectrum data corresponding to the divided parallel channel words of each channel supplied from said time division multiplexing means are read out from said memory means according to said track pattern;
   accumulating means for each channel, for accumulating the spectrum data read out from said memory means by a channel word unit of n+m bits;
   comparison control means for comparing the resultant values of said accumulating means of each channel with one another to generate a selection control signal for selecting the channel word having the desired frequency characteristics on the basis of the compared result and feeding back a control signal for presetting the accumulation value of the unselected accumulating means to the value of the accumulating means of the selected channel, to said accumulation means; and
   recording means for selecting one among the plurality of channel words of n+m bits supplied from said encoding means on the basis of said selection control signal and recording the selected channel word on the information track of the magnetic record medium so as to be a serial channel word.

11. A digital signal recorder according to claim 10, wherein said memory means for each channel comprises:
   a first LUT including data regions in which data forming a peak and having no DC component according to said track pattern is stored;
   a second LUT including data regions in which data forming a notch according to said track pattern is stored; and
   a third LUT including data regions in which data forming a dip on either side of said peak according to said track pattern is stored.

12. A digital signal recorder according to claim 10 wherein said period of the spectral energy is a positive number times the period of a system clock.

13. A method of processing digital data in real time for recording on a magnetic medium such that the recorded data exhibits selected frequency characteristic patterns useful in read head tracking during playback, the method comprising the steps of:
   receiving a series of digital information data bytes for recording;
   assembling a plurality of said information bytes so as to form a parallel information word;
   replicating the information word so as to form multiple information words in parallel;
   inserting at least one additional bit into each information word so as to form a channel word;
   setting the additional bits to a different value in each of the channel words, so that each of the channel words has the same number of information bits but also includes a unique combination of the additional bits;
   analyzing the frequency characteristics of each of the channel words in parallel relative to a selected frequency characteristic pattern;

selecting one of the channel words that most closely exhibits the selected frequency characteristic pattern; and recording the selected channel word on the magnetic recording medium wherein analyzing the channel words includes dividing the channel word into a plurality of smaller channel word segments, analyzing the channel word segments, and integrating the results over said plurality of channel word segments so as to form an indication of the frequency characteristics of the entire channel word relative to the selected frequency characteristic pattern.

14. A method according to claim 13 wherein said analyzing the channel word segments includes:

defining a frequency characteristic pattern;

synthesizing spectrum data by combining the channel word segment with the defined frequency characteristic pattern for every possible bit pattern of the channel word segment;

storing the synthesized spectrum data in a look-up table; and using the channel word segment as address bits to access the corresponding stored spectrum data.

15. A method according to claim 13 wherein the look-up tables are organized by data regions, each data region containing data responsive to a respective one of a plurality of predetermined frequency characteristic patterns.

16. A method according to claim 13 wherein the look-up tables include:

a first look-up table for storing data that exhibits a peak in frequency characteristic at a selected frequency;

a second look-up table for storing data that exhibits a notch in frequency characteristic at a selected frequency; and a third look-up table for storing data that exhibits dips in frequency characteristic about a selected frequency.

17. A method according to claim 13 wherein said dividing the channel word includes selecting a common divisor of a selected pilot signal frequency and the period of the channel word, and dividing the channel word by the common divisor number of units.

18. A method according to claim 17 wherein said analyzing the channel word segments includes, for each channel, addressing all of the plurality of look-up tables in parallel to read out spectrum data;

integrating the spectrum data from each of the look-up tables;

forming a respective absolute value of each of the integrated spectrum data values; and summing together all of the absolute values so as to form an error signal.

19. A method according to claim 13 including time-division multiplexing the channel word segments for accessing the look-up tables so as to read out a series of spectrum data from the look-up tables, and integrating the series of spectrum data thereby forming an integrated value for the entire channel word.

* * * * *

UNITED STATES PATENT AND TRADEMARK OFFICE
CERTIFICATE OF CORRECTION

PATENT NO. : 5,852,529
DATED : December 22, 1998
INVENTOR(S) : Ko et al.

It is certified that error appears in the above-identified patent and that said Letters Patent is hereby corrected as shown below:

Column 6,
Line 25, "preceding" should read -- precoding --.

Signed and Sealed this

Twenty-sixth Day of March, 2002

Attest:

*Attesting Officer*

JAMES E. ROGAN
*Director of the United States Patent and Trademark Office*